(No Model.)

G. W. COFFIN.
CAR BRAKE.

No. 294,013. Patented Feb. 26, 1884.

WITNESSES:
M E Harrison
H M Grant

INVENTOR.
George W. Coffin
per C D Lewis Atty.

N. PETERS. Photo-Lithographer, Washington. D. C.

UNITED STATES PATENT OFFICE.

GEORGE W. COFFIN, OF PITTSBURG, PENNSYLVANIA.

CAR-BRAKE.

SPECIFICATION forming part of Letters Patent No. 294,013, dated February 26, 1884.

Application filed December 10, 1883. (No model.)

*To all whom it may concern:*

Be it known that I, GEORGE W. COFFIN, a citizen of the United States, residing at Pittsburg, in the county of Allegheny and State of Pennsylvania, have invented a new and useful device that has for its object the setting, releasing, and adjusting the brakes of a car by means of a worm or perpetual screw operating in a toothed wheel attached to a cylinder or drum carrying a chain connected to a lever of the brakes, so that by turning the perpetual screw in one direction the chain will be wound around the drum in such a manner as to draw the brakes gradually and tightly against the wheels of the car, and there rigidly hold them without danger of relaxation or sudden release until so required, when, by turning the perpetual screw in a reverse direction, the chain will be unwound, whereby the brakes may be at liberty to recede or fall back from the wheels.

To enable others to understand my invention, its application, and mode of operation, I will proceed to describe the same by reference to the accompanying drawings, wherein—

Figure 1:
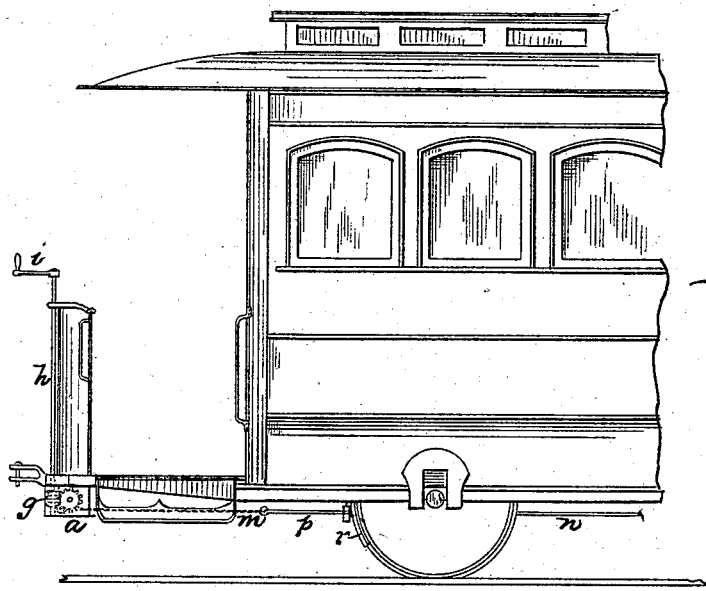
Figure 2:
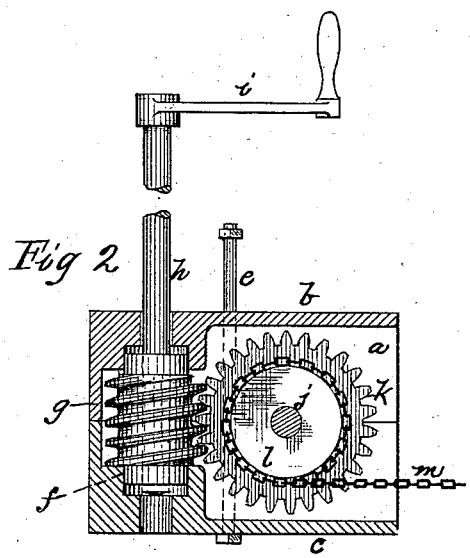
Figure 3:
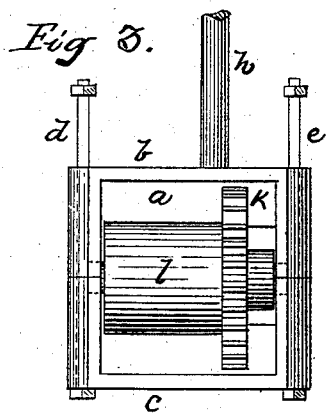

Figure 1 represents a side elevation of one end of a street-car provided with my improved brake-operating device, having the nearest side thereof removed for the purpose of exhibiting its interior; Fig. 2, a vertical longitudinal section of the supporting-box, showing the perpetual screw, toothed wheel, drum, and chain thereon as inclosed and made operable therein; Fig. 3, a rear view of such device.

To put my invention into practice, I construct a metallic box, $a$, of suitable strength and dimensions, which box is preferably formed in two pieces or halves, $b$ $c$, that are substantially alike, and when properly put together constitute a receptacle and support for such parts as are intended to operate therein. The two halves $b$ $c$ of this box are securely united, the one to the other, by means of vertical bolts $d$ $e$, that are of sufficient length to pass through, and thereby affix the box underneath the platform of a car. The rear end of this box $a$ is open, and in the forward or closed end is arranged in proper bearings a short hollow cylinder, $f$, around the outside of which is formed a spiral worm or perpetual screw, $g$, and as a means for rotating the same it is provided with a removable axis or shaft, $h$, the lower part of which is square, and in that respect corresponds with the hollow of the cylinder $f$, through which it extends. The upper end of this shaft $h$ is furnished with an ordinary winch or hand crank, $i$, by the instrumentality of which effective power may be applied to the screw.

At right angles to the spiral worm $g$, and centrally within the box, is arranged a small shaft, $j$, carrying a toothed wheel, $k$, that engages the perpetual screw; and this wheel $k$ is provided with a cylindrical drum, $l$, having attached thereto one end of a suitable chain, $m$, the other end of which is connected to a long rod, $n$, made fast to the lever $p$ of the brake $r$. By this construction, combination, and arrangement of parts it becomes an exceedingly effective device in the hands of a brakeman, it being obvious that on turning the screw in one direction the toothed wheel will be caused to rotate and wind the chain upon the drum, and thus draw the brakes against the car-wheels, and there hold them without the use of clutch or analogous contrivance.

By the application of my invention there is less jar in the setting of the brakes, and when required they may be as easily and readily released by simply turning the screw in a reverse direction.

Having thus briefly described my invention, I claim—

The car-brake herein described, consisting of the boxing $b$ $c$, secured together and to the platform of the car by rods $d$ $e$, the worm $g$, having the cylinder $f$ seated in bearings in the boxing, the shaft $j$, carrying the toothed wheel $k$, meshing with said worm, the drum $l$ on said shaft, having one end of the chain $m$ attached thereto, the other end thereof connected to the rod $n$ and lever $p$ of the brake, and the removable crank-shaft $h$, for winding and unwinding the chain on the drum to operate the brake, as shown and described.

GEORGE W. COFFIN.

Witnesses:
WM. M. DUNCAN,
JAS. J. MCAFEE.